(12) United States Patent
Friesen

(10) Patent No.: US 8,657,026 B2
(45) Date of Patent: Feb. 25, 2014

(54) HARROW

(76) Inventor: Michael Ian James Friesen, Altona (CA)

(*) Notice: Subject to any disclaimer, the term of this patent is extended or adjusted under 35 U.S.C. 154(b) by 493 days.

(21) Appl. No.: 12/893,334

(22) Filed: Sep. 29, 2010

(65) Prior Publication Data

US 2012/0073844 A1    Mar. 29, 2012

(51) Int. Cl.
*A01B 63/00* (2006.01)

(52) U.S. Cl.
USPC .......................................... 172/452

(58) Field of Classification Search
USPC .................. 172/614, 615, 622, 452
See application file for complete search history.

(56) References Cited

U.S. PATENT DOCUMENTS

| | | | | |
|---|---|---|---|---|
| 3,006,422 | A | * | 10/1961 | Mighell ......................... 172/142 |
| 3,356,382 | A | * | 12/1967 | Fay ............................. 280/43.23 |
| 3,486,761 | A | * | 12/1969 | Fay ............................. 280/43.23 |
| 3,765,159 | A | * | 10/1973 | Neff ............................... 56/396 |
| 3,828,860 | A | * | 8/1974 | Poland ........................... 172/311 |
| 4,335,894 | A | | 6/1982 | Swanson |
| 4,371,039 | A | * | 2/1983 | Schaaf et al. ................ 172/244 |
| 4,615,286 | A | * | 10/1986 | Linton ............................. 111/52 |
| 5,449,042 | A | | 9/1995 | Landphair et al. |
| 5,492,182 | A | | 2/1996 | Delaurier |
| 6,164,386 | A | | 12/2000 | Delaurier |
| 7,478,683 | B2 | | 1/2009 | Peck et al. |

* cited by examiner

*Primary Examiner* — Thomas B Will
*Assistant Examiner* — Joel F. Mitchell
(74) *Attorney, Agent, or Firm* — Ryan W. Dupius; Kyle R. Satterwaite; Ade & Company Inc.

(57) ABSTRACT

A harrow includes plural hydraulic actuators to displace respective working elements between opposing first and second positions. The actuators are connected in series in a phasing relationship to define one or more hydraulic circuits. Each circuit includes a lead actuator mounted in a first orientation to displace the respective working elements in a first direction when extended and a secondary actuator in series with the lead actuator in an opposing second orientation to displace the respective working elements in the first direction when retracted. One of the ports of the secondary actuator is coupled to the same one of the ports of the lead actuator such that all of the working elements are simultaneously displaced in a common direction when supplying hydraulic fluid under pressure to the lead actuator. Additional actuators may be similarly connected in series in alternating orientations with the lead and secondary actuators of each circuit.

14 Claims, 8 Drawing Sheets

HARROW

FIELD OF THE INVENTION

The present invention relates to an agricultural implement frame supporting a plurality of working elements thereon which are hydraulically controlled by a series of hydraulic actuators connected in a phasing relationship, and more particularly the present invention relates to a harrow in which the tine angle is adjusted by a series of hydraulic actuators in phase with one another.

BACKGROUND

A field harrow's performance can be tuned to the conditions the user faces by adjusting the tine angle to change the aggressiveness of the harrow tines. Typically the harrow comprises a plurality of harrow sections supported along the length of a tool bar. Each harrow section consists of several bars spaced apart and each has several harrow tines mounted to it. The bars of each harrow section are linked together with a link arm of that section. The control of the link arm is typically controlled either independently of the other harrow sections using hydraulics, or the link arms are linked together using a rockshaft spanning the width of the sections.

Examples of a rockshaft linking the harrow sections can be found in U.S. Pat. Nos. 5,492,182 and 6,164,386 by Delaurier. While this configuration is suitable for linking the rotation of the tine angles for common tine angle adjustment, differences in ground contour can result in some tines engaging the ground with greater pressure than other sections so that the harrowing action may not be even regardless of the tine angle being maintained the same throughout the implement.

Alternatively, common tine angle adjust can be accomplished by using phasing cylinders linked in series. Use of hydraulics can more evenly distribute the ground engaging force among the tines, but traditional use of phasing cylinders generally require a complex arrangement of parts. Phasing cylinders work by connecting one port of each cylinder to an alternating port of the next cylinder in the series. Oil is forced into the first cylinder on one side of the piston. As the cylinder rod and piston are moving from the added oil, it is also displacing oil out the top port being forced out from the piston. This volume however is not equal to the same amount of oil entering the cylinder on the bottom side of the cylinder due to the fact there is a cylinder rod on the top end and thus a smaller surface area of the piston causing a decrease in oil output. While the first cylinder's top port is connected to the second cylinder's bottom port, the second cylinder's cross section will need to match that of the first cylinders piston minus the cross section area of the rod to produce the same amount of stroke. This series can include as many cylinders as desired, as long as they are all sized differently in a proper sequence. An illustration of a typical series of master and slave cylinders in a phasing relationship is shown in FIG. 1 in which the area about the piston rod of the piston is equal to the area of the cylinder end of the next cylinder to which it is connected so that the cylinders are displaced simultaneously with one another. A large implement with many cylinders in series results in costly maintenance as each cylinder is different in size and configuration so that each cylinder requires its own dedicated replacement parts.

Various examples of hydraulic circuits are described in U.S. Pat. No. 7,478,683 by Peck et al, U.S. Pat. No. 5,449,042 by Landphair et al, and U.S. Pat. No. 4,335,894 by Swanson; however, none are well suited for use in a harrow for controlling tine angle in an efficient manner as conventional rotary rephasing valves and other conventional rephasing techniques are used.

SUMMARY OF THE INVENTION

According to one aspect of the invention there is provided a ground working implement comprising:

an elongate tool bar;

ground wheels supporting the tool bar for movement across the ground in a forward working direction at right angles to the tool bar;

a plurality of working elements coupled to the tool bar for movement relative thereto between opposing first and second positions;

a plurality of hydraulic actuators associated with respective ones of the working elements to displace the elements between the opposing first and second positions when the respective actuators are extended or retracted;

each hydraulic actuator having one fluid port arranged to extend the actuator when receiving hydraulic fluid therein and a second fluid port arranged to retract the actuator when receiving hydraulic fluid therein;

at least one of the hydraulic actuators comprising a lead actuator mounted in a first orientation relative to the tool bar so as to be arranged to displace the respective working elements in a first direction from the first position towards the second position when the actuator is extended;

at least one of the hydraulic actuators comprising a secondary actuator in series with said at least one of the hydraulic actuators comprising the lead actuator so as to form a common hydraulic circuit in a phasing relationship therewith, the secondary actuator being mounted in a second orientation relative to the tool bar opposite the first orientation so as to be arranged to displace the respective working elements in the first direction from the first position towards the second position when the secondary actuator is retracted;

one of the ports of the secondary actuator being coupled to the same one of the ports of the lead actuator of the common hydraulic circuit such that all of the working elements associated with the common hydraulic circuit are simultaneously displaced in a common direction when supplying hydraulic fluid under pressure to the lead actuator.

According to a second aspect of the present invention there is provided a ground working implement comprising:

an elongate tool bar;

ground wheels supporting the tool bar for movement across the ground in a forward working direction at right angles to the tool bar;

a plurality of separate harrow sections for mounting on the tool bar at a plurality of spaced positions thereon along the length thereof for movement therewith across the ground in a harrowing action;

each harrow section comprising:

a frame;

a frame suspension for mounting the frame on the tool bar so as to trail in a longitudinal direction behind the tool bar in a substantially horizontal plane;

a plurality of parallel tine support bars mounted on the frame at longitudinally spaced positions to extend transversely to the longitudinal direction of the frame;

a plurality of harrow tine elements at spaced positions along each tine support bar, each harrow tine having an upper portion fixed to the respective bar and a lower ground engaging portion extending downwardly from the respective bar for engagement with the ground, each tine support bar being mounted on the frame for rotational movement relative thereto about an axis longitudinal of the tine support bar so as to vary the angle of each tine mounted thereon about the axis of the tine support bar and relative to the ground;

each frame having an actuator arm extending generally longitudinal of the frame and a plurality of cranks each extending from the arm to a respective one of the tine support bars such that longitudinal movement of the arm causes simultaneous rotation of the tine support bars each about its respective axis between opposing first and second positions corresponding to different tine angles;

each frame having a hydraulic actuator associated therewith which is coupled by a linkage to simultaneously rotate the tine support bars when the actuator is extended or retracted;

each hydraulic actuator having one fluid port arranged to extend the actuator when receiving hydraulic fluid therein and a second fluid port arranged to retract the actuator when receiving hydraulic fluid therein;

at least one of the hydraulic actuators comprising a lead actuator mounted in a first orientation on the respective frame so as to be arranged to rotate the tine support bars in a first direction of rotation corresponding to displacement of the tine elements from the first position towards the second position when the actuator is extended;

at least one of the hydraulic actuators comprising a secondary actuator in series with said at least one of the hydraulic actuators comprising the lead actuator so as to form a common hydraulic circuit in a phasing relationship therewith, the secondary actuator being mounted in a second orientation on the respective frame opposite the first orientation so as to be arranged to rotate the respective tine support bars in the first direction of rotation corresponding to displacement of the tine elements from the first position towards the second position when the secondary actuator is retracted;

one of the ports of the secondary actuator being coupled to the same one of the ports of the lead actuator of the common hydraulic circuit such that all of the tine elements associated with the common hydraulic circuit are simultaneously rotated in a common direction of rotation when supplying hydraulic fluid under pressure to the lead actuator.

The present invention allows for a simpler method of adjusting the harrow tine angle from the cab of the tractor while eliminating the requirement for various different sizes of cylinders or the need for a rockshaft. Two main distinguishing features of the present invention are the use of a unique configuration of phasing cylinders and the positioning of these cylinders relative to the harrow sections. The cylinders are all the same bore and stroke, however there are typically 2 types or two different mounting configurations. One has the phasing port at the top of the cylinder (rod end) and the other has one at the bottom (barrel end). This allows the some cylinders to phase while extended and others to phase when retracted.

One example of how the cylinders are set up on the harrow sections is described and illustrated in the accompanying specification. Beginning with the first cylinder, it will end up pushing forward to rotate the harrow tines back. The next section adjacent to the first is then facing towards the back of the frame and will retract to rotate the tines backwards. What happens here as opposed to typical series phasing circuits is that the rod end port of the first cylinder is attached to the rod end port of the second cylinder, resulting in the exact same volume displacement coming from the first cylinder to the second cylinder. This produces the exact same stroke on each cylinder. This system, just as the regular phasing series circuit, can have as many cylinders as desired. The major benefits of this design mainly are the adjustability being available to the user from one hydraulic control in the cab, parts commonality for simplicity, and an increased cylinder force available.

The unique cylinder configuration is applied to the harrow sections by accommodating a method of hooking up the cylinder in both forward and backwards orientations.

Another advantage to this setup is the increase capacity the cylinders will have. In a standard phasing circuit, the amount of force each cylinder can produce is a function of the line pressure and the area of the smallest cylinder in the series. With this new configuration, it is possible to have the same amount of power throughout the system and it is defined by the size of all the cylinders that are being used. In addition to this, since it is possible link a cylinder both forward and backwards, it is possible to mechanically link 2 cylinders together on the center harrow section, while phasing one cylinder to the left and the other to the right which will effectively double the capacity as well.

Preferably all of the hydraulic actuators of the common hydraulic circuit are identical in size and configuration to one another.

When used on larger implement frames having more sections, preferably at least one of the hydraulic actuators comprises a third actuator in series with said at least one of the hydraulic actuators comprising the lead actuator so as to form the common hydraulic circuit in phasing relationship therewith. In this instance, the third actuator is preferably mounted in the first orientation on the respective frame opposite the second orientation of the secondary actuator of the common hydraulic circuit so as to be arranged to rotate the respective tine support bars in the first direction of rotation corresponding to displacement of the tine elements from the first position towards the second position when the third actuator is extended. Similarly, one of the ports of the third actuator is coupled to the same one of the ports of the secondary actuator of the common hydraulic circuit such that all of the tine elements associated with the common hydraulic circuit are simultaneously rotated in a common direction of rotation when supplying hydraulic fluid under pressure to the lead actuator.

Similarly, when used on even larger implement frames, at least one of the hydraulic actuators preferably comprises a fourth actuator in series with said at least one of the hydraulic actuators comprising the lead actuator so as to form the common hydraulic circuit in phasing relationship therewith in which the fourth actuator is mounted in the second orientation on the respective frame opposite the first orientation of the third actuator.

In the illustrated embodiment, the hydraulic actuators include two lead actuators and two secondary actuators in which each lead actuator defines a respective hydraulic circuit and includes one of the secondary actuators associated therewith. The secondary actuator is preferably mounted in an opposing orientation relative to the respective lead actuator with one of the ports of each secondary actuator being coupled to the same one of the ports of the respective lead actuator such that each secondary actuator is in a phasing relationship with the respective lead actuator of the common hydraulic circuit.

Preferably the lead actuators are mounted in opposing first and second orientations relative to one another and are mechanically coupled to one another for movement together between the respective opposing positions.

In this instance, the lead actuators are preferably supported on a common central harrow section with each secondary actuator being supported on a harrow section supported on a respective lateral wing relative to the central harrow section.

Each harrow section is preferably substantially identical in configuration by providing each harrow section with a first mounting location for mounting the respective actuator in the first orientation thereon and a second mounting location for mounting the respective actuator in the second orientation thereon.

The linkage coupling each actuator to the respective tine support bars may comprise a lever arm coupled to one of the tine support bars for rotation therewith. In this instance, the frame may include first and second mounting locations arranged for coupling a cylinder end of the respective actuator thereto and the lever arm is preferably arranged for coupling a piston end of the respective actuator thereto.

The lever arm of each linkage may be supported on a central one of the tine support bars of the respective harrow section in the longitudinal direction such that the hydraulic actuators may be oriented generally in the longitudinal direction in both the first and second orientations thereof.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 3:
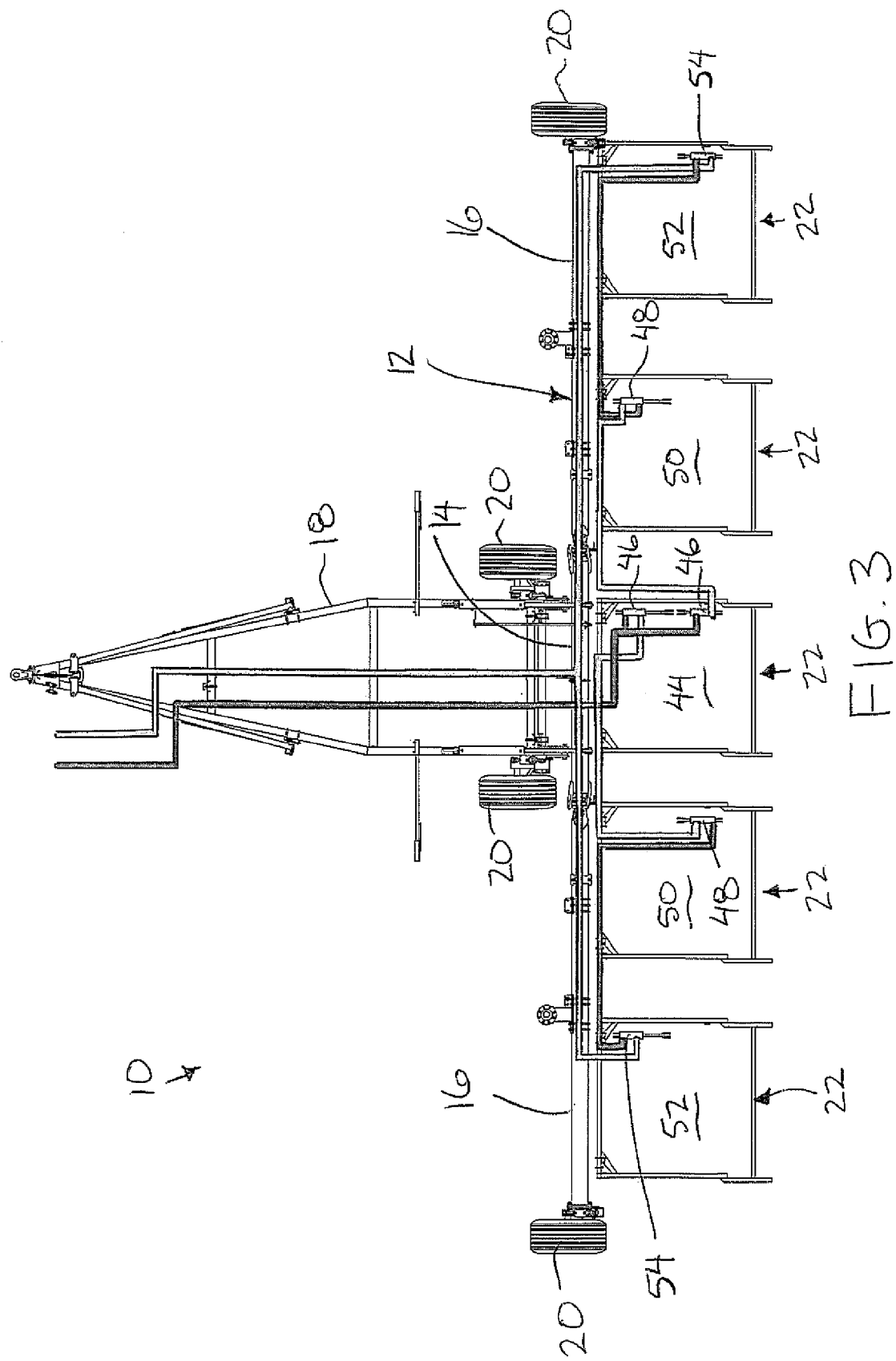
FIG. 3 is a top plan view of the series of hydraulic actuators according to FIG. 2 shown supported on an agricultural harrow frame.
Figure 4:
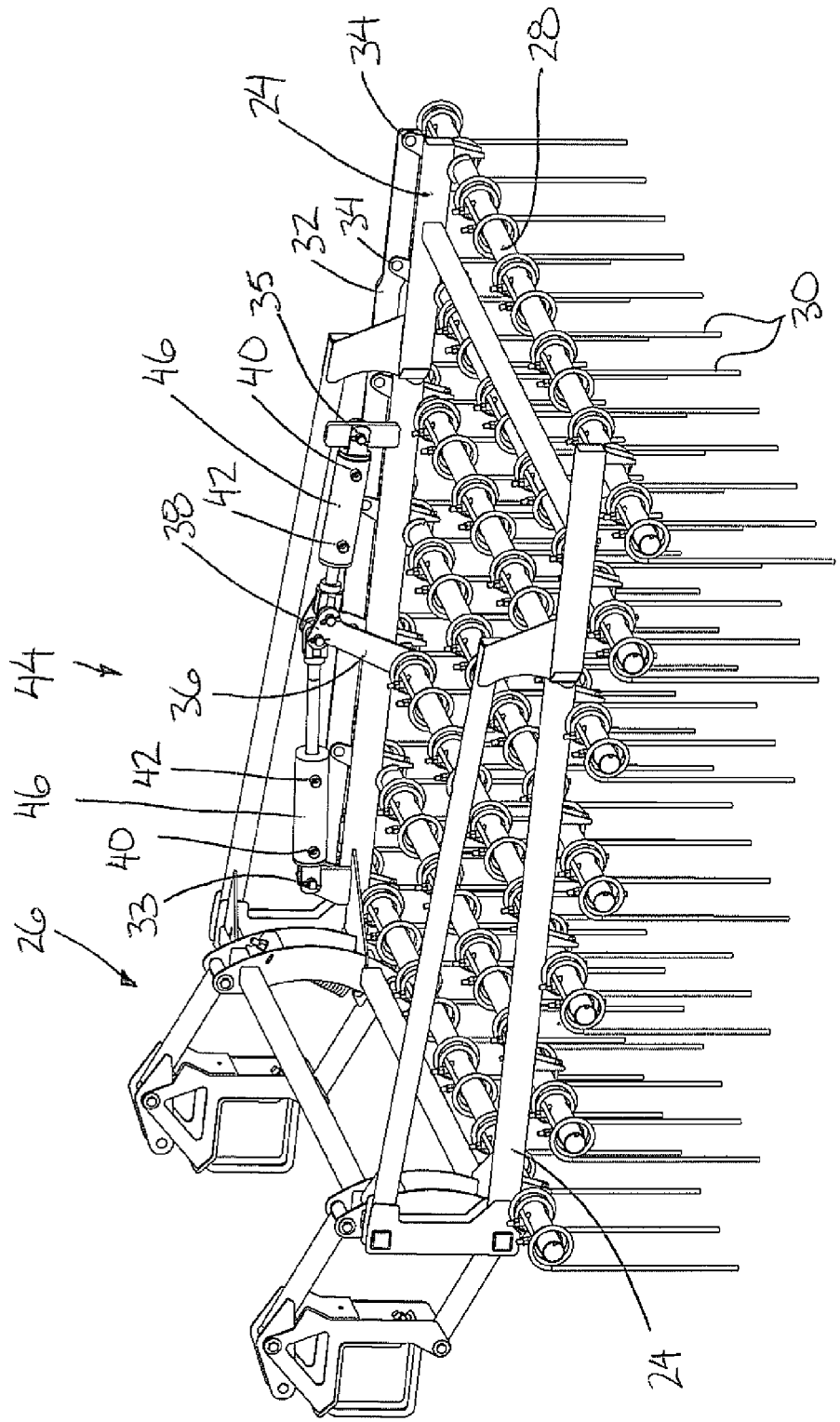
FIG. 4 and FIG. 5 are a perspective views of the central harrow section of the harrow frame according to FIG. 3.
Figure 5:
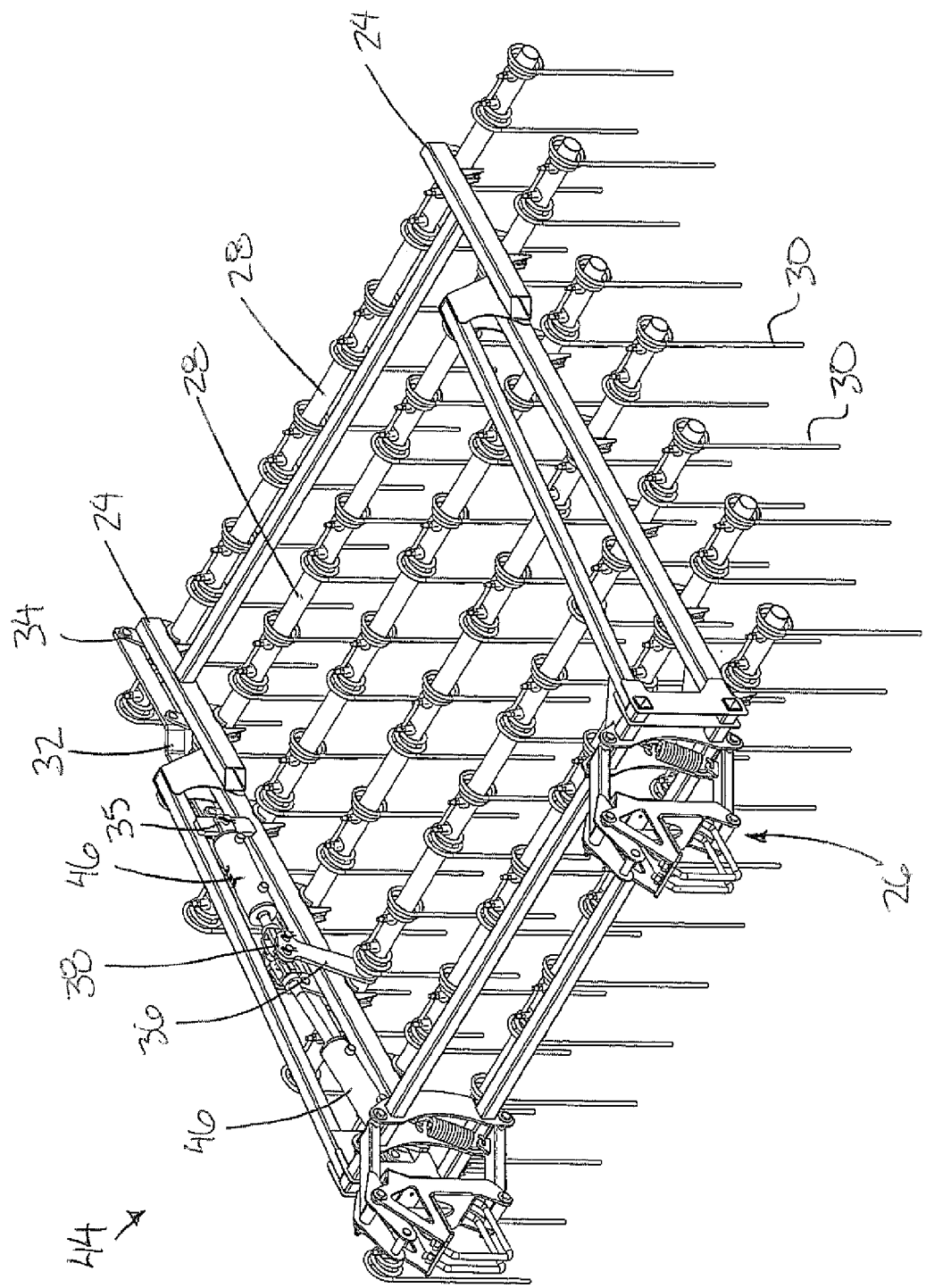

Referring to the accompanying figures, there is illustrated a harrow implement generally indicated by reference numeral 10. The implement 10 is typically towed across a field in the working position of the implement as shown in FIG. 3. The implement is displaced in the forward working direction together with the towing vehicle to which it is connected.

The implement 10 generally includes a frame comprising an elongate tool bar 12 which extends generally horizontally and perpendicularly to the working direction. The tool bar includes a center bar 14 and two wings 16 extending laterally outward from opposing sides from the center bar so as to be pivotal in relation thereto between the working position of FIG. 3 and a transport position extending generally rearward of the center bar.

The frame further comprises a hitching arm 18 extending forward of the center bar for connection to the towing vehicle. Ground wheels 20 are provided for supporting the tool bar for rolling movement across the ground in the forward working direction at right angles to the tool bar.

The implement further comprises a plurality of harrow sections 22 which are substantially identical to one another in configuration. The harrow sections 22 are spaced apart in a lateral direction along the length of the tool bar for movement therewith in a harrowing action when displaced in the forward working direction.

Each harrow section 22 comprises a frame having two rails 24 extending in a longitudinal direction corresponding to the forward working direction of the implement. The two rails 24 are joined by suitable cross members so as to be laterally spaced apart along opposing sides of the respective harrow section.

A suitable frame suspension 26 is provided for mounting each respective harrow section onto the tool bar such that the harrow section trails behind the tool bar with the frame thereof in a generally horizontal plane extending rearward in the longitudinal direction in the working position.

Each harrow section includes a plurality of tine support bars 28 supported on the frame to span horizontally in a lateral direction between the two rails 28 of that section. The support bars are parallel to one another and to the tool bar while being spaced apart from one another in the longitudinal direction. Each tine support bar is supported for rotation about its respective longitudinal axis relative to the frame upon which it is supported.

A plurality of tine elements 30 are mounted on each tine support bar at spaced apart positions in the lateral direction. Each tine element 30 includes an upper portion fixed onto the bar for rotation of the element together with the bar and a lower ground engaging portion in the form of an elongate rod extending downward from the upper portion fixed on the bar. All of the tine elements are supported parallel to one another so as to extend generally downward from the respective bars at the same angle from vertical. Rotation of the tine support bars causes the tine elements supported thereon to be rotated therewith about the longitudinal axis of the tine support bar for varying the inclination of the tines.

Each harrow section 22 further comprises an actuator arm 32 which connects between the tine support bars of that section such that all of the tine support bars of the respective section are rotated together and all of the tines of each section remain parallel to one another as the tine angle is varied. The actuator arm extends in the longitudinal direction of the frame and includes a pivotal connection to the free end of a crank 34 supported on each of the tine support bars. The cranks 34 are mounted on respective tine support bars for rotation therewith and to extend in a radial direction upwardly therefrom to the upper free end which is pivotally supported on the actuator arm 32.

A hydraulic system is provided for controlling the tine angle which receives a supply of hydraulic fluid under pressure from an output on the towing vehicle controlled by an operator of the towing vehicle so that the tine angle can be readily adjusted using existing controls of the towing vehicle. The hydraulic system of the implement 10 generally comprises a plurality of hydraulic actuators associated with respective ones of the harrow sections 22.

Each harrow section 22 is arranged to mount one of the hydraulic actuators thereon in either one of a forward or rearward orientation. A lever arm 36 is fixed onto a central one of the tine bars in the longitudinal direction so as to extend radially upward from the respective tine support bar to an upper free end 38 having respective forward and rearward mounting apertures formed thereon. The forward and rearward mounting apertures are arranged for coupling the piston end of a hydraulic actuator in the forward or rearward orientations respectively. The lever arm is pivotal together with the respective tine support bar such that controlling the position of the lever arm rotates the respective tine support bar which simultaneously rotates the other tine support bars by their connection through the cranks 34 and the actuator arm 32.

To accommodate the forward or rearward orientation of the hydraulic actuators, each frame also includes a front mounting location 33 on the frame which is forward of the lever arm 36 for mounting the cylinder end of the hydraulic actuator in the forward orientation thereon and a rear mounting location 35 on the frame which is rearward of the lever arm for mounting the cylinder end of the hydraulic actuator thereon in the rearward orientation. In this arrangement the hydraulic actuator extends generally in the longitudinal direction of the frame in either one of the forward or rearward mounting positions because of the mounting of the lever arm to a central one of the tine support bars.

Each hydraulic actuator further includes an extension port 40 and a retraction port 42 at opposite ends of the cylinder of the hydraulic actuator which function to extend or retract the piston relative to the cylinder when receiving hydraulic fluid under pressure respectively therein.

The harrow sections 22 include a central section 44 supported on the center bar 14 of the tool bar as well as a plurality of additional harrow sections supported on each of the wings 16 of the tool bar. In the illustrated embodiment a second harrow section and a third harrow section are provided on each of the wings, however as will be appreciated by one of ordinary skill in the art, each wing can support one, two, three or more harrow sections thereon according to the overall size of the implement 10.

In the illustrated embodiment, the central section 44 is provided with two actuators comprising lead actuators 46 in which each lead actuator defines a respective hydraulic circuit comprised of a group of actuators connected in series with one another in a phasing relationship. Each hydraulic circuit is associated with a respective one of the wings of the tool bar, and each directly receives a supply of hydraulic fluid under pressure when increasing the aggressiveness of the harrowing action.

When one port of each lead actuator is connected to receive fluid under pressure directly from the vehicle supply, the other port functions as a re-phasing port to discharge fluid to a second actuator 48 of the respective hydraulic circuit associated with that lead actuator. The second actuators are associated with respective second harrow sections 50 mounted immediately adjacent to and on opposing sides of the central section on the respective wings of the tool bar.

The next harrow sections on the two wings which are adjacent to and laterally outward from respective second harrow sections 50 comprise third harrow sections 52 which include respective third actuators 54 associated therewith. The third actuators are similarly connected in series with the respective hydraulic circuits to receive fluid from the second actuators 48 connected in series respectively therewith.

In further embodiments fourth frames may be provided adjacent to and spaced laterally outward from the third frames respectively with respective fourth actuators associated therewith which are similarly connected in series to the respective third actuators as described above with regard to the relationship between the third and second actuators. Additional frames and associated actuators may be provided in a continuing series as described above.

Figure 6:
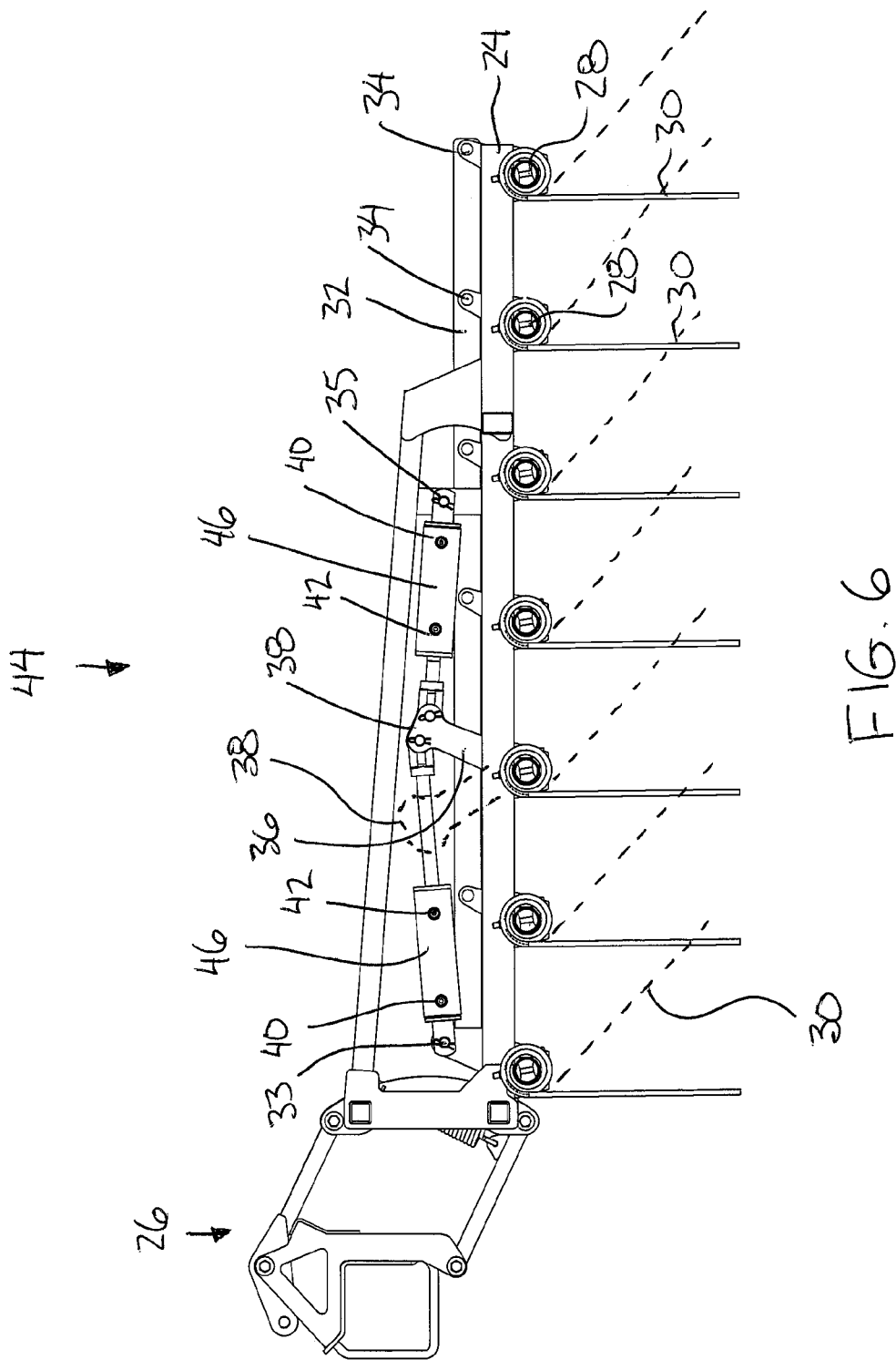
FIG. 6 is a side elevational view of the central harrow section.
Figure 7:
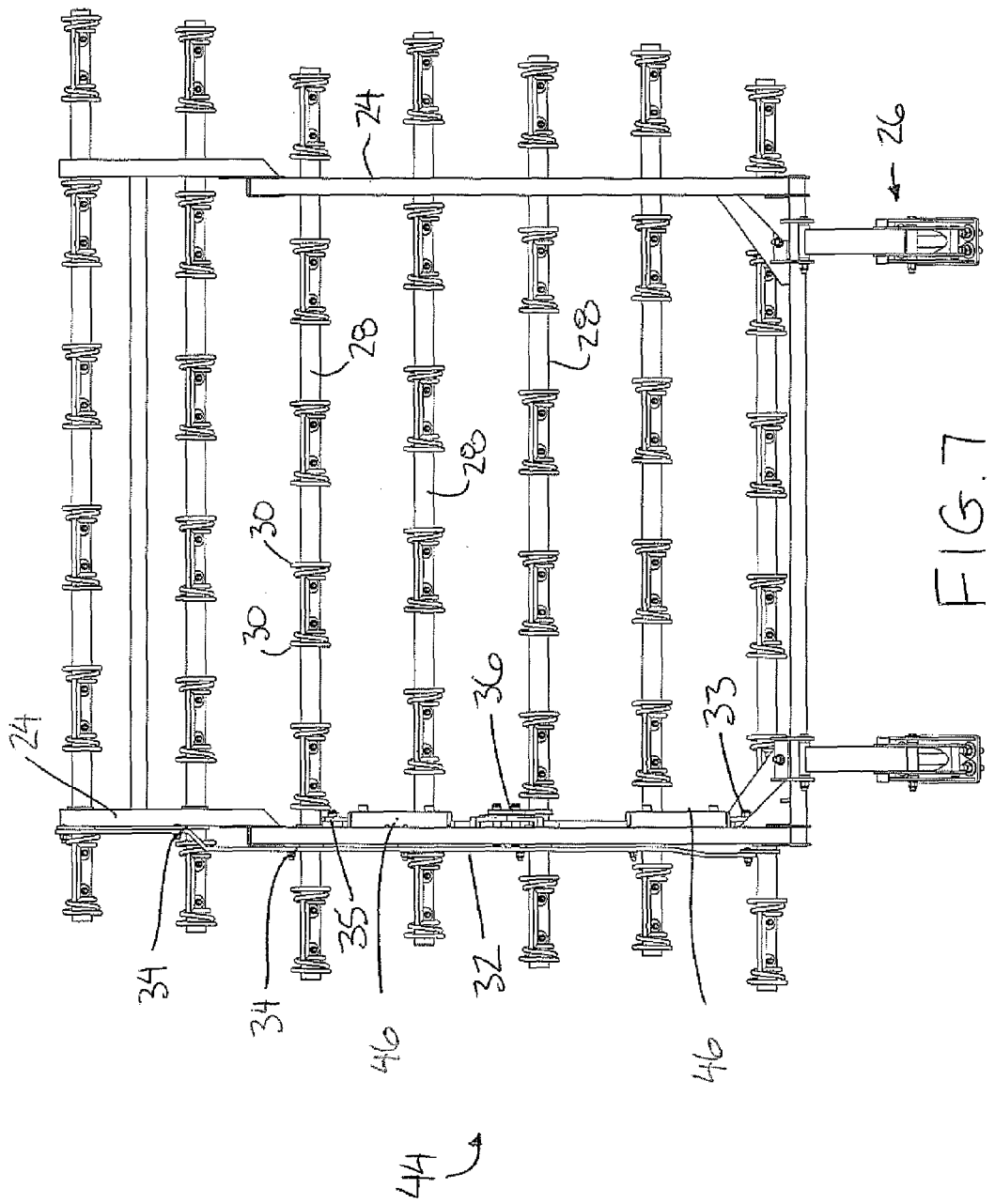
FIG. 7 is a top plan view of the central harrow section.
Figure 8:
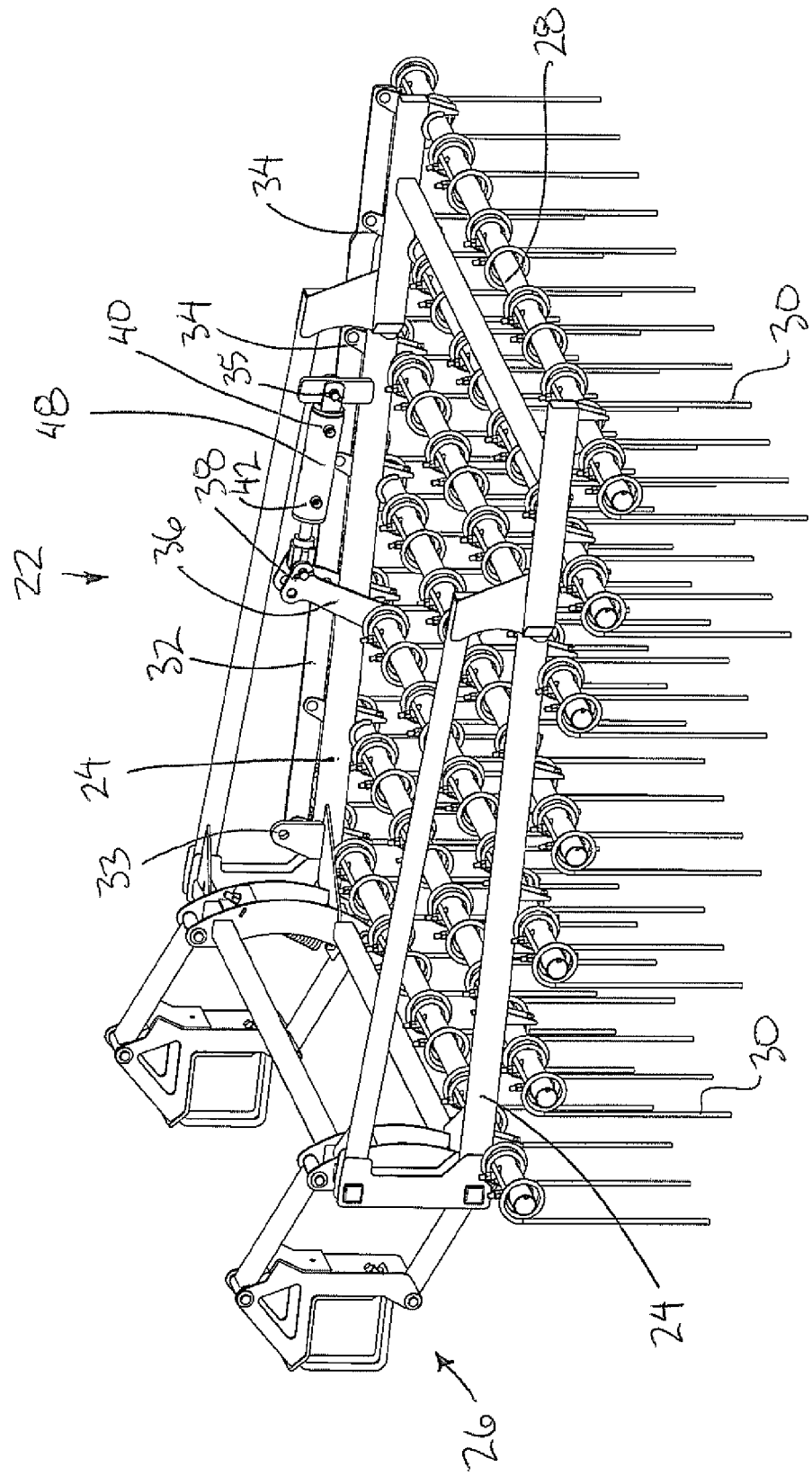
FIG. 8 and FIG. 9 are perspective views of respective harrow sections supported adjacent to and on opposing sides of the central harrow section on respective wing sections of the harrow frame.
Figure 9:
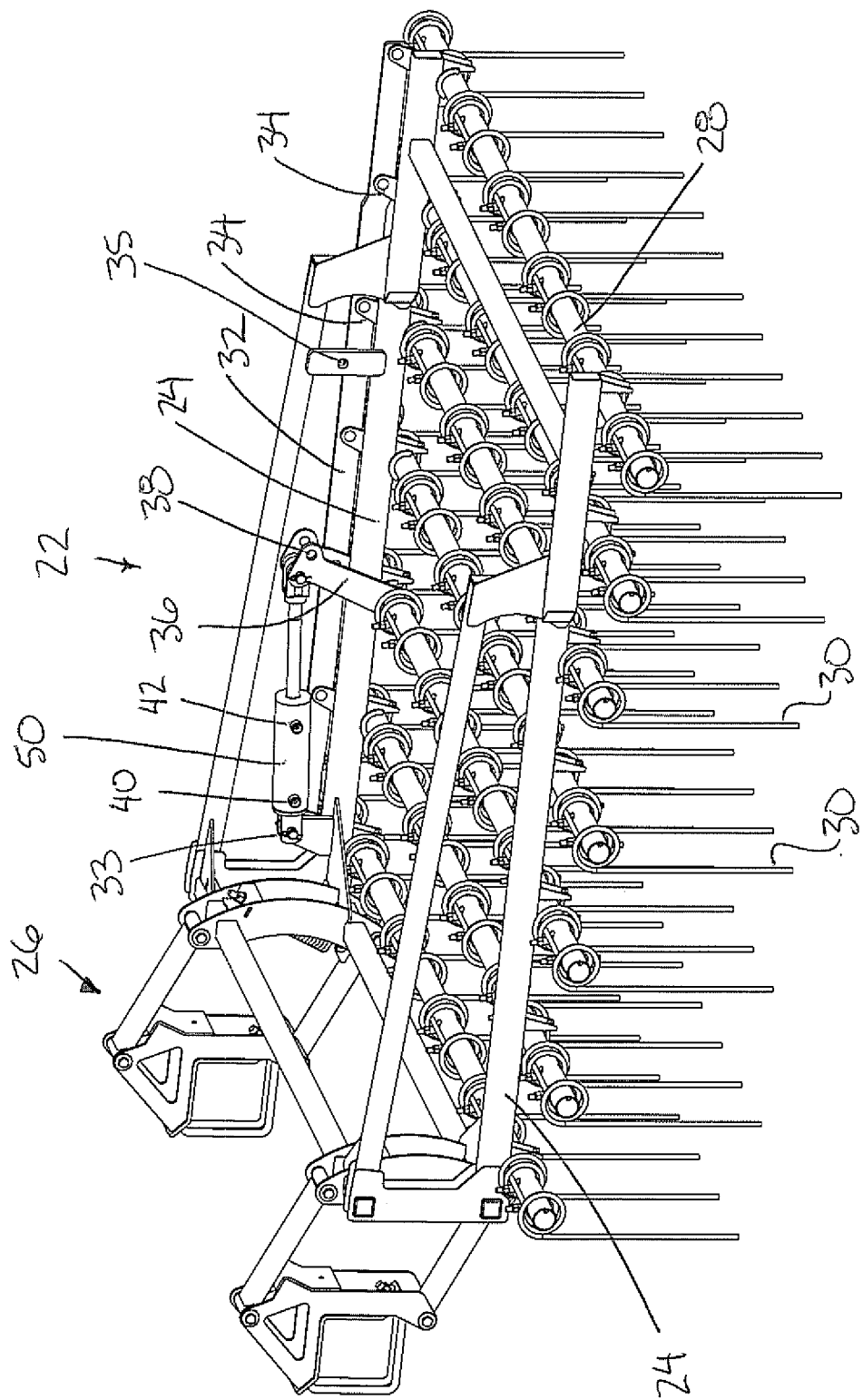

The two lead actuators 46 are commonly mounted on the central harrow section 44 so as to be mechanically linked by a common connection to the lever arm of the central section. Specifically, one of the lead actuators is mounted in the forward orientation and the other is mounted in the rearward orientation. When the lead actuator in the forward orientation is extended, the lead actuator in the rear orientation is simultaneously retracted while the lever arm and tine support bars linked therewith are rotated in a first direction corresponding to the tines being displaced forwardly to be more aggressive and more vertical in orientation. Alternatively when the forwardmost lead actuator is retracted and the rearwardmost lead actuator is extended the tine support bars are rotated in an opposing second direction corresponding to rearward displacement of the tines from the first forward position shown in solid line in FIG. 6 to the second rearward position thereof shown in broken line in FIG. 6 which is more inclined downwardly and rearwardly from the vertical forward position.

The second actuator associated with each lead actuator is coupled to the respective lead actuator of the same circuit such that the second actuator and the lead actuator are in opposing forward and rearward orientations relative to one another. The third and fourth actuators are similarly mounted in an opposing orientation to the previous actuator of the same circuit which are connected in series therewith. Accordingly the hydraulic actuators alternate between respective forward and rearward orientations on the respective harrow sections in sequence with one another along each hydraulic circuit.

As shown specifically in FIG. 3, the forwardmost lead actuator 46 receives hydraulic fluid under pressure from the towing vehicle supply at the extension port thereof to rotate the tines forwardly from the rear position to the forward position thereof while the retraction port comprises a re-phasing port which exhausts hydraulic fluid to the same retracting port of the second actuator of the same hydraulic circuit. As this second actuator is mounted in the opposing rearward orientation, extension of the forwardmost lead actuator results in retraction of the respective second actuator which still functions to rotate the tines associated therewith in the same direction as the center section by displacing the tines forwardly from the rear position to the forward position by only supplying hydraulic fluid to the lead actuator.

Similarly the extension port of the hydraulic circuit of the forwardmost lead actuator comprises a re-phasing port which exhausts fluid to the same extension port of the third actuator in the forward position for rotating the tines of the third frame in the same direction.

Where a fourth frame is provided the third actuator exhausts fluid to the same corresponding port of the fourth actuator which in turn returns the fluid to the hydraulic return of the towing vehicle. When no fourth frame is provided, the third actuator returns fluid to the hydraulic return of the towing vehicle. The hydraulic actuators of the hydraulic circuit associated with the lead actuator in the rearward position are similarly arranged but in an opposing orientation to the hydraulic circuit of the forwardmost lead actuator.

Figure 1:
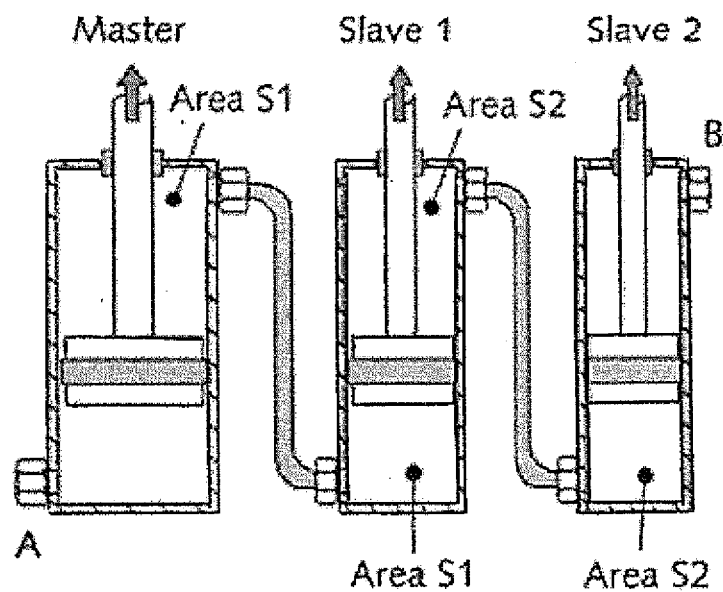
FIG. 1 is a schematic representation of a series of hydraulic actuators in a phasing relationship according to a prior art configuration.
Figure 2:
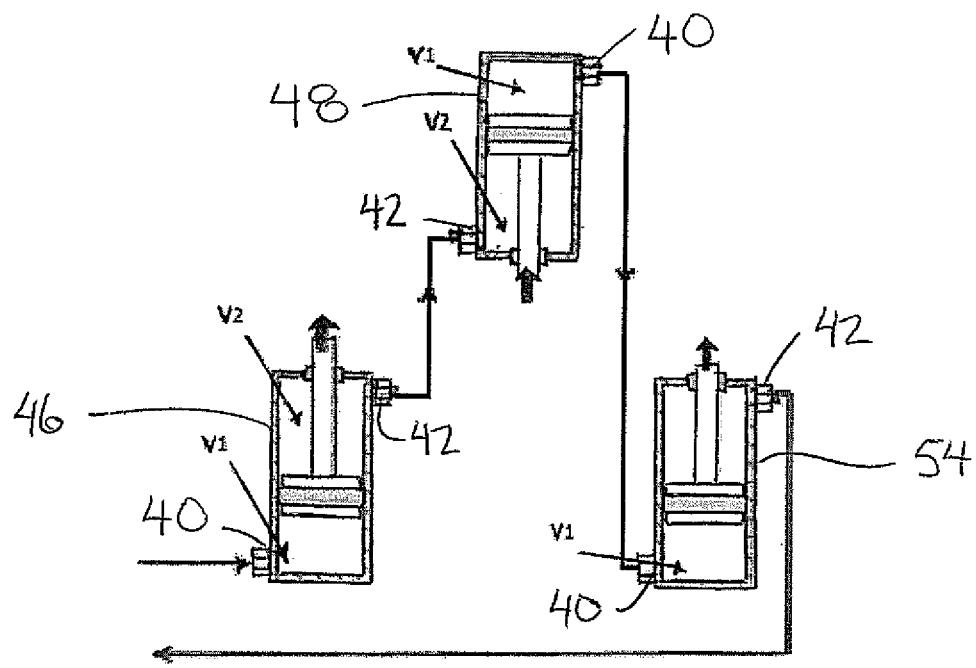
FIG. 2 is a schematic representation of a series of hydraulic actuators in a phasing relationship according to the present invention.

In this instance all of the hydraulic actuators are identical in size and configuration such that the volume of fluid displaced from the lead actuator results in a displacement of the associated second actuator which is identical to the linear displacement of the lead actuator for simultaneously displacing all of the tines together in the same direction by the same amount. As shown in FIG. 2, the volume and cross sectional area at the piston end of the cylinder of the forward most lead hydraulic actuator corresponds to the same volume and area associated with the same end of the cylinder of the second actuator when the same retraction ports are coupled to one another so that the same direction and magnitude of linear displacement is effected by both the lead and second actuator and any other actuators connected in an alternating orientation therewith in series in a phasing relationship as described above.

The hydraulic circuits of the present invention have the advantage of maintaining the movement of multiple working elements simultaneously with one another in a phasing relationship while using a series of hydraulic actuators which are identical in size and configuration to one another for ease of maintaining a plurality of like parts. Linking two parallel hydraulic circuits by mechanically coupling the two lead actuators effectively doubles the output force available from a common hydraulic input pressure from the hydraulic system of the towing vehicle.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A ground working implement comprising:
    an elongate tool bar;
    ground wheels supporting the tool bar for movement across the ground in a forward working direction at right angles to the tool bar;
    a plurality of frame sections including a lead section and a pair of secondary sections coupled to the tool bar;
    a plurality of working elements supported on the frame sections coupled to the tool bar for movement relative the frame sections between opposing first and second positions;
    a plurality of hydraulic actuators including a pair of lead actuators supported on the lead section and a plurality of secondary actuators supported on the secondary sections respectively;
    each hydraulic actuator having a first fluid port arranged to extend the actuator when receiving hydraulic fluid therein and a second fluid port arranged to retract the actuator when receiving hydraulic fluid therein;
    some of the hydraulic actuators being mounted in a first orientation relative to the tool bar so as to be arranged to displace the respective working elements in a first direction from the first position towards the second position when the hydraulic actuator is extended;
    some of the hydraulic actuators being mounted in a second orientation relative to the tool bar opposite the first orientation so as to be arranged to displace the respective working elements in the first direction from the first position towards the second position when the hydraulic actuator is retracted;
    the pair of lead actuators being associated with the working elements on the lead section to displace the working elements on the lead section between the opposing first and second positions;
    each secondary actuator being associated with the working elements on the respective secondary section to displace the working elements on the respective secondary section between the opposing first and second positions;
    each secondary actuator being connected in series with a respective one of the lead actuators so as to form a common hydraulic circuit in a phasing relationship therewith and so as to be in an opposing orientation relative to said respective one of the lead actuators;
    the two lead actuators being arranged to communicate with a common hydraulic fluid supply such that the two common hydraulic circuits of the two lead actuators respective are in parallel with one another;
    the pair of lead actuators being mechanically coupled so as to be arranged for movement together with the working elements of the lead section between the first and second positions of the respective working elements by the mechanical coupling therebetween;
    each secondary actuator being mounted in an opposing one of the first and second orientations relative to the respective lead actuator such that one of the first and second fluid ports of the secondary actuator is coupled to the same one of the first and second fluid ports of the lead actuator of the respective common hydraulic circuit and such that all of the working elements associated with the both common hydraulic circuits are simultaneously displaced in a common direction when supplying hydraulic fluid under pressure commonly to the lead actuators.

2. The implement according to claim 1 wherein the hydraulic actuators are identical in size to one another.

3. The implement according to claim 1 wherein the hydraulic actuators further comprises a pair of third actuators associated with working elements on respective third sections of the frame sections to displace the working elements on the third sections between first and second positions thereof, each third actuator being coupled in series with a respective one of the common hydraulic circuits in phasing relationship therewith, the third actuator being coupled to the respective secondary actuator of the common hydraulic circuit in an opposing one of the first and second orientations relative to the secondary actuator of the common hydraulic circuit such that one of the first and second fluid ports of the third actuator is coupled to the same one of the first and second fluid ports of the secondary actuator of the common hydraulic circuit and such that all of the working elements associated with the common hydraulic circuit are simultaneously displaced in a common direction when supplying hydraulic fluid under pressure to the lead actuators.

4. The implement according to claim 1 wherein the lead actuators are mounted in opposing first and second orientations relative to one another.

5. A ground working implement comprising:
    an elongate tool bar;
    ground wheels supporting the tool bar for movement across the ground in a forward working direction at right angles to the tool bar;
    a plurality of separate harrow sections for mounting on the tool bar at a plurality of spaced positions thereon along the length thereof for movement therewith across the ground in a harrowing action;
    each harrow section comprising:
        a frame;
        a frame suspension for mounting the frame on the tool bar so as to trail in a longitudinal direction behind the tool bar in a substantially horizontal plane;
        a plurality of parallel tine support bars mounted on the frame at longitudinally spaced positions to extend transversely to the longitudinal direction of the frame;
        a plurality of harrow tine elements at spaced positions along each tine support bar, each harrow tine having an upper portion fixed to the respective bar and a lower ground engaging portion extending downwardly from the respective bar for engagement with the ground,
        each tine support bar being mounted on the frame for rotational movement relative thereto about an axis longitudinal of the tine support bar so as to vary the angle of each tine mounted thereon about the axis of the tine support bar and relative to the ground;
        each frame having an actuator arm extending generally longitudinal of the frame and a plurality of cranks each extending from the arm to a respective one of the tine support bars such that longitudinal movement of the arm causes simultaneous rotation of the tine support bars each about its respective axis between opposing first and second positions corresponding to different tine angles;

each frame having a hydraulic actuator associated therewith which is coupled by a linkage to simultaneously rotate the tine support bars when the actuator is extended or retracted;

each hydraulic actuator having a first fluid port arranged to extend the actuator when receiving hydraulic fluid therein and a second fluid port arranged to retract the actuator when receiving hydraulic fluid therein;

at least one of the hydraulic actuators comprising a lead actuator mounted in a first orientation on the respective frame so as to be arranged to rotate the tine support bars in a first direction of rotation corresponding to displacement of the tine elements from the first position towards the second position when the actuator is extended;

at least one of the hydraulic actuators comprising a secondary actuator in series with said at least one of the hydraulic actuators comprising the lead actuator so as to form a common hydraulic circuit in a phasing relationship therewith, the secondary actuator being mounted in a second orientation on the respective frame opposite the first orientation so as to be arranged to rotate the respective tine support bars in the first direction of rotation corresponding to displacement of the tine elements from the first position towards the second position when the secondary actuator is retracted;

one of the first and second fluid ports of the secondary actuator being coupled to the same one of the first and second fluid ports of the lead actuator of the common hydraulic circuit such that all of the tine elements associated with the common hydraulic circuit are simultaneously rotated in a common direction of rotation when supplying hydraulic fluid under pressure to the lead actuator;

wherein each harrow section includes both a first actuator mounting location and a second actuator mounting location on the frame such that:
i) each harrow section is arranged to support one of the hydraulic actuators coupled between the first actuator mounting location on the frame and the respective linkage in the first orientation; and
ii) each harrow section is arranged to support one of the hydraulic actuators coupled between the second actuator mounting location on the frame and the respective linkage in the second orientation.

6. The implement according to claim 5 wherein the hydraulic actuators are identical in size to one another.

7. The implement according to claim 5 wherein at least one of the hydraulic actuators comprises a third actuator in series with said at least one of the hydraulic actuators comprising the lead actuator so as to form the common hydraulic circuit in phasing relationship therewith, the third actuator being mounted in the first orientation on the respective frame opposite the second orientation of the secondary actuator of the common hydraulic circuit so as to be arranged to rotate the respective tine support bars in the first direction of rotation corresponding to displacement of the tine elements from the first position towards the second position when the third actuator is extended, wherein one of the ports of the third actuator is coupled to the same one of the ports of the secondary actuator of the common hydraulic circuit such that all of the tine elements associated with the common hydraulic circuit are simultaneously rotated in a common direction of rotation when supplying hydraulic fluid under pressure to the lead actuator.

8. The implement according to claim 5 wherein the hydraulic actuators include two lead actuators and two secondary actuators, each lead actuator defining a respective hydraulic circuit and each including one of the secondary actuators associated therewith, wherein the secondary actuator is mounted in an opposing orientation relative to the respective lead actuator, and wherein one of the ports of each secondary actuator is coupled to the same one of the ports of the respective lead actuator such that each secondary actuator is in a phasing relationship with the respective lead actuator of the common hydraulic circuit.

9. The implement according to claim 8 wherein the lead actuators are mounted in opposing first and second orientations relative to one another.

10. The implement according to claim 8 wherein the lead actuators are mechanically coupled to one another for movement together between the respective opposing positions.

11. The implement according to claim 10 wherein the lead actuators are supported on a common central harrow section, each secondary actuator being supported on a harrow section supported on a respective lateral wing relative to the central harrow section.

12. The implement according to claim 5 wherein each harrow section is substantially identical in configuration.

13. The implement according to claim 5 wherein the linkage coupling each actuator to the respective tine support bars comprises a lever arm coupled to one of the tine support bars for rotation therewith, the frame including first and second mounting locations arranged for coupling a cylinder end of the respective actuator thereto and the lever arm being arranged for coupling a piston end of the respective actuator thereto.

14. The implement according to claim 13 wherein the lever arm of each linkage is supported on a central one of the tine support bars of the respective harrow section in the longitudinal direction and wherein the hydraulic actuators are oriented generally in the longitudinal direction in both the first and second orientations thereof.

* * * * *